July 18, 1939.  J. L. HILL  2,166,493
BRAKE UNIT
Filed Oct. 26, 1937   2 Sheets-Sheet 1
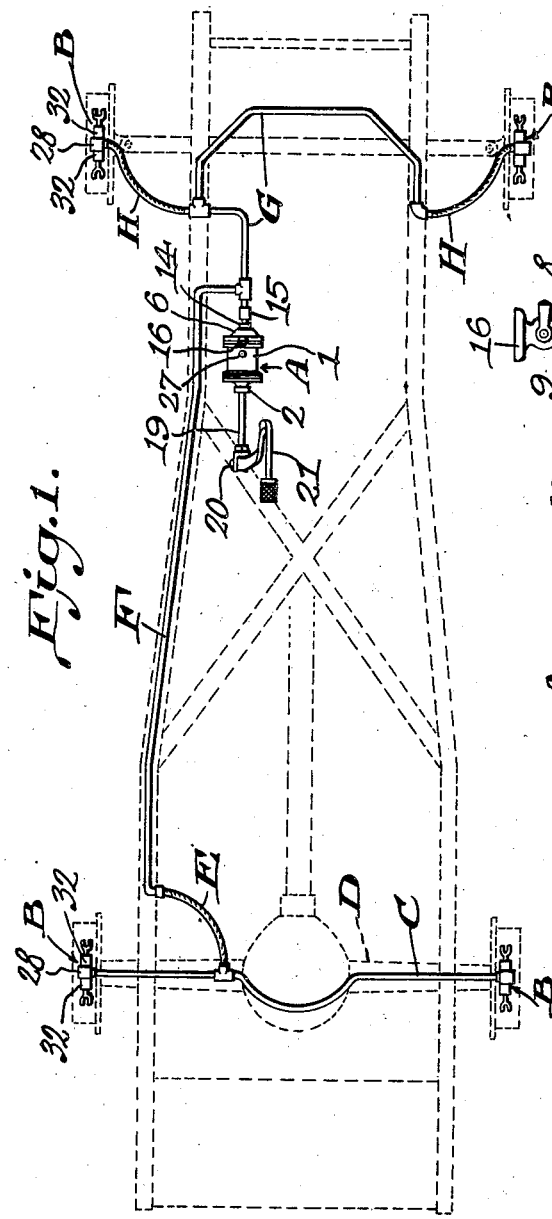
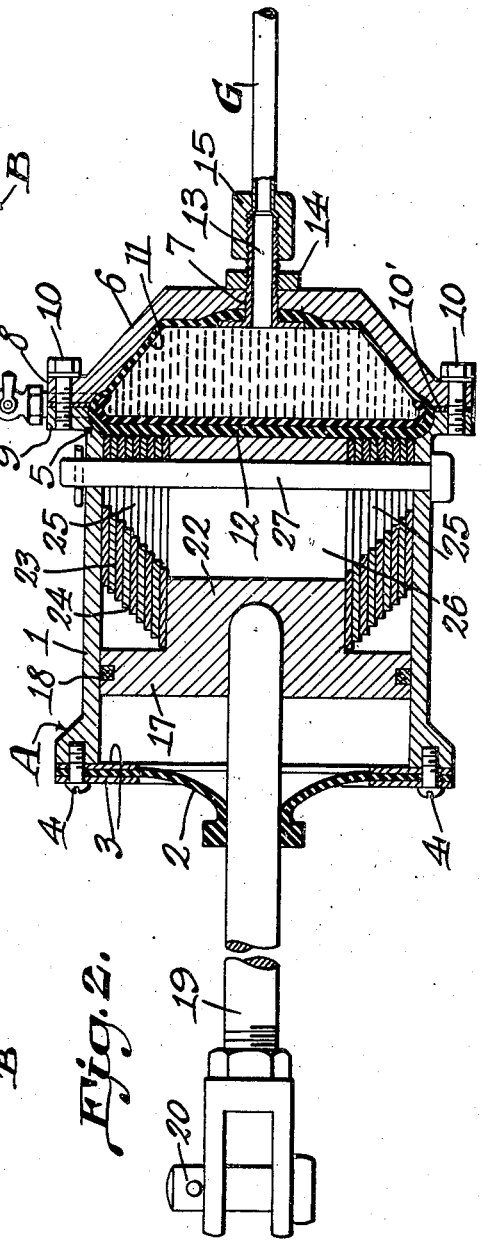
James L. Hill
INVENTOR.
BY
ATTORNEYS.

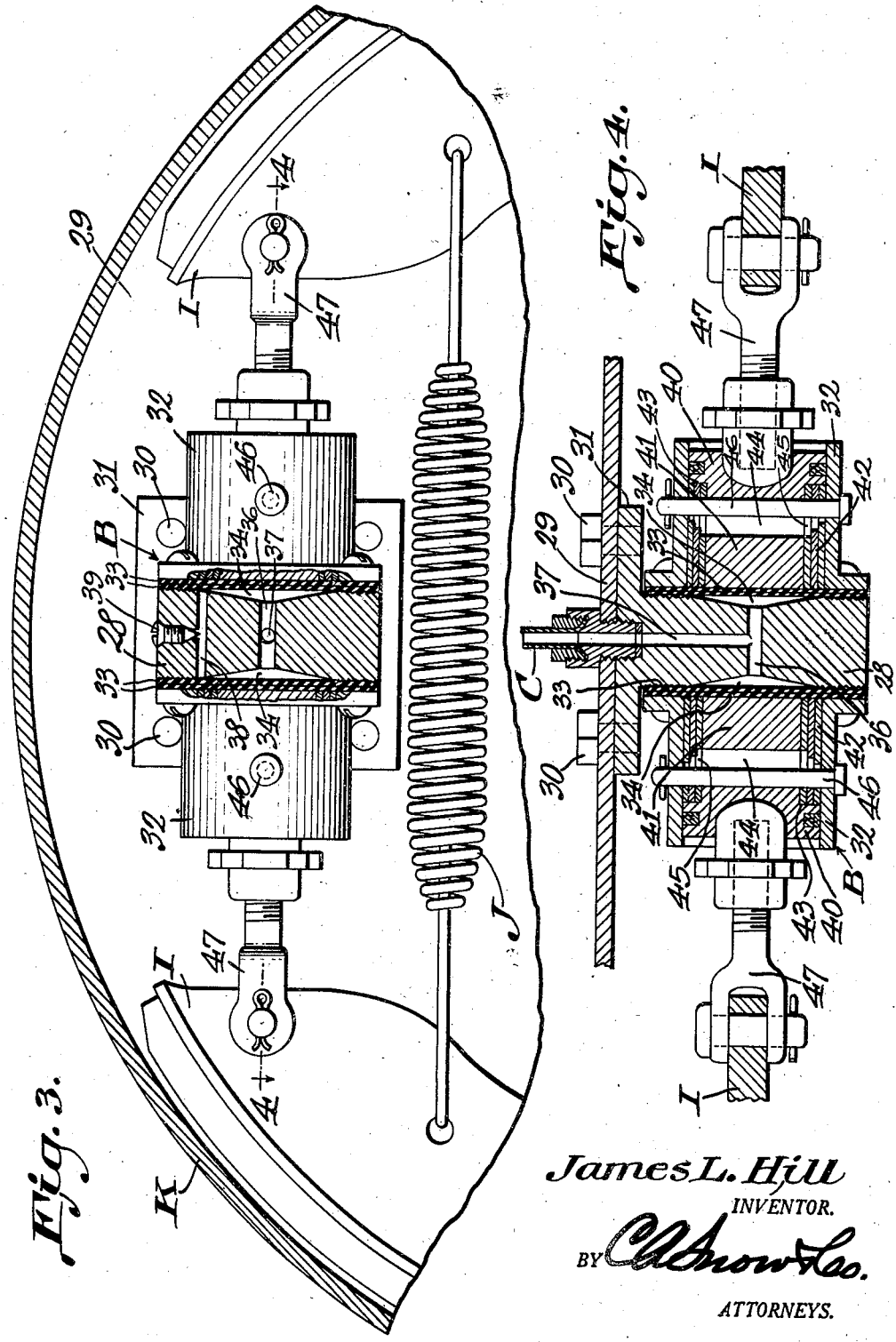

Patented July 18, 1939

2,166,493

UNITED STATES PATENT OFFICE 2,166,493

BRAKE UNIT

James Lewis Hill, Kansas City, Mo.

Application October 26, 1937, Serial No. 171,145

5 Claims. (Cl. 60—54.6)

This invention relates to units for use in the actuation of vehicle brakes and the like utilizing liquid or air as the power transmitting medium, one of the objects being to provide a unit which is positively sealed against leakage, is capable of using ordinary denatured alcohol or air or other fluid, has the minimum number of metal parts for contact with the fluid so that corrosion is thus practically eliminated, and materially reduces the wear upon the parts.

It is a further object to provide brake apparatus which does not require the pumping of the brake pedal at times before the brake will take hold.

A still further object is to provide apparatus in which wear upon the working parts does not reduce the efficiency.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a plan view of the complete apparatus constituting the present invention, the chassis of a vehicle to which it is applied being indicated by broken lines.

Figure 2 is an enlarged section through the master unit of the apparatus.

Figure 3 is a side elevation of a portion of the brake and the improved wheel unit combined therewith.

Figure 4 is a section taken longitudinally through the wheel unit on the line 4—4, Figure 3.

Referring to the figures by characters of reference A designates the master unit of the brake apparatus while the wheel units have been indicated at B. Where four wheel units are employed, the units of the rear wheels are connected by a metal tube C carried by the rear axle housing D. This tube is joined by a flexible tube E to a metal tube F extending longitudinally of the chassis and opening into a rigid tube G extending from the outlet of the master unit A and transversely of the chassis. This tube G, in turn, is connected by flexible tubes H to the units of the respective front wheels. Thus it will be seen that when the master unit A is actuated, liquid, air or other fluid used as a power transmitting medium, will be propelled within all of the tubes simultaneously so that all of the wheel units will be actuated at the same time. In view of the fact that flexible connections are provided at E and H, motion of the chassis relative to the axles will not be interfered with.

The master unit has been shown in detail at Figure 2. It comprises a cylindrical housing 1 one end of which is closed by a protecting disk 2 of rubber or other suitable flexible material a marginal portion of which is preferably held between two clamping rings 3 and fastened securely to the end of the housing by means of bolts 4 or the like.

The other end of the housing is flared to provide a rounded annular seat 5 and is closed by a frusto-conical head or cap 6 having a central opening 7. This cap is provided with an annular flange 8 and a similar flange 9 is provided on the housing 1, the two flanges being fastened securely together by means of bolts 10. A sealing washer 10' is preferably interposed between these flanges.

A fluid container 11 formed preferably of rubber, is fitted within the hollow head or cap 6 and has a flat base 12 preferably of double thickness as shown and the rounded marginal portion of which fits snugly upon the seat 5. This base forms a diaphragm.

A tubular outlet stem 13 opens into and projects from the container 11 and is secured in the opening 7 in any suitable manner, as by means of a nut 14 and this outlet tube is suitably coupled, as at 15, to the tube G hereinbefore referred to.

A valve 16 communicates with the interior of the container 11 and is utilized for filling or for bleeding the apparatus. This valve is normally closed.

A master piston 17 is mounted for reciprocation within the housing 1 and is provided with suitable packing 18 to prevent leakage. This piston has a rod 19 fixedly secured thereto and extending through the disk 2. This rod is suitably connected, as at 20, to a pedal lever 21 such as commonly employed for the actuation of a foot brake. It will be apparent that the disk 2 serves to prevent the admission of dirt and moisture into the space between said disk and the piston, this disk being adapted to flex as the piston and its rod are moved inwardly and outwardly during the actuation of the brake.

The piston 17 is formed with a concentric cylindrical extension 22 surrounded by a plurality of concentric tubes 23 fitted closely to each other but adapted to have relative sliding movement. These tubes are normally flush at one end where they contact the base of the fluid container 11 while the other ends of the tubes, which are remote from container 11, are stepped, as shown at 24, this being due to the fact that the length of the tubes diminishes progressively from the center tube outwardly.

The tubes 23 are formed with matching longitudinal slots 25 opening into the ends of a slot 26 extending diametrically through the cylindrical extension 22 of the piston and extending through these slots 25 and 26 is a retaining pin 27 which holds the tubes against relative movement in one direction so that they thus are maintained flush with the adjacent end of the piston under normal conditions. The slots 25 in the tubes diminish in length outwardly from the innermost tube, those ends of the slots nearest the fluid container 11 being normally flush so as normally to bear against the pin 27 while the other ends of the slots are stepped, to correspond with the stepped ends 24. Thus it will be noted that the inner tubes are capable of moving longitudinally greater distances than the outer tubes.

One of the wheel units has been illustrated in detail in Figures 3 and 4. This unit is positioned between the brake elements I which normally are drawn toward each other by spring J. The wheel unit is adapted, when actuated, to move the brake elements I away from each other against the action of spring J, thereby to apply them to the retaining drum K, as is the usual practice.

By referring to said figures it will be noted that the base 28 of the wheel unit is bolted or otherwise fixedly attached to the stationary plate 29, by means of fastening elements 30 extending through said plate and through a flange 31 carried by the base. This base, as a matter of fact, constitutes the head for each of two opposed cylinders 32 which are fastened to the base and serve as means for clamping diaphragms 33 at their margins to the base. Recesses 34 are provided in the base back of the respective diaphragms and communicate through a port 36 in the base which, in turn, opens into a bore 37. If the unit is carried by one of the rear wheels, the tube C will be joined thereto so as to communicate with bore 37 whereas, if the unit is carried by one of the front wheels, one of the flexible tubes H will be coupled thereto so as to open into bore 37.

A vent 38 communicates with recesses 34 and is normally closed by a suitable valve 39. This arrangement is provided for bleeding purposes.

A piston 40 is mounted for reciprocation within each of the cylinders 32 and each piston has a reduced cylindrical extension 41 bearing at its inner end against the diaphragm 33. This reduced portion is surrounded by concentric slidably connected tubes or sleeves 42 the ends of which are normally flush so as to bear against the annular shoulder 43 provided at the base of the reduced extension 41 and also to be supported flush with the inner end of said extension.

A slot 44 is extended diametrically through the extension 41 and the ends thereof open into slots 45 formed in the tubes or sleeves 42. These slots normally bear at one end against a retaining pin 46 extending diametrically through cylinder 32 and when the parts are in their normal positions, those ends of the slots remote from the diaphragms 33 bear against the pin as shown. The slots are of different lengths, the innermost slot 45 being longer than the outermost slot and the inner ends of these slots, which are the ends nearest the diaphragm 33, being stepped as shown. Thus when the parts are moved out of normal position, it becomes possible for the inner sleeve to move longitudinally a greater distance than the next adjoining sleeve. Normally, however, the several sleeves and the piston on which they are mounted, provide a flat surface against which the diaphragm 33 can bear.

The two pistons 40 are adjustably coupled to forked arms 47 which straddle and are pivotally connected to the brake element I.

Assuming that the container 11, the tubes C, E, F and G, the bore 37, port 36, and spaces 34 are all filled with alcohol, air, or other pressure transmitting fluid, it will be apparent that when pedal lever 21 is shifted out of normal position, the piston 17 will be thrust toward head 6. The end of the extension 22 will first move inwardly against the base of the container 11 after which the large end of the piston 17 will successively pick up the tubes or sleeves 24 so that they will be successively advanced so that their advancing spaces thus will present a contour simulating that of the head or cap 6 with the result that the fluid within the container 11 will be gradually expelled into tube G and thence distributed so as to exert pressure against the flexible diaphragms 33. These diaphragms will be caused to bulge outwardly simultaneously, first pressing the outer sleeves 42 longitudinally until they are stopped by pin 46 and then the intermediate and finally the inner sleeves until ultimately the diaphragm in its extended position, will be backed practically at all points by these sleeves and the ends of the extensions 41. Thus there is no danger of the diaphragm becoming ruptured as a result of unequal backing over the area thereof. Obviously when the diaphragms are thus operated and the pistons 40 shifted, pressure will be transmitted to the elements I so that they will be shifted against the drum K. When pressure is removed from the pedal lever 21, the spring J, returning the elements I to their normal positions, will also operate the pistons 40 and the parts associated therewith for the purpose of restoring the diaphragms 33 to their initial positions and thereby reversing the flow of the thrust transmitting fluid so as to return it to the container 11 which, in expanding, will return piston 17 and its sleeves to their normal positions as shown in Figure 2.

It will be apparent that brake apparatus such as herein described is leak-proof, is practically free from metal parts likely to become corroded by the pressure transmitting fluid, and will operate easily and efficiently.

Importance is attached to the fact that both in the master unit and in the wheel units flexible fluid controlled elements, which are the base 12 and the diaphragms 33, are properly backed or reenforced by the cooperating pistons sleeves while in all positions, thereby being relieved from uneven strains and resultant excessive wear or rupture.

What is claimed is:

1. In brake apparatus a brake unit including a cylinder, a fluid actuated flexible element closing one end of the cylinder, a piston in the cylinder having a reduced extension bearing against one surface of said element, concentric relatively slidable sleeves on said extension and having longitudinal slots of different lengths respectively, means extending through and slidably engaged by the piston extension and the slotted sleeve for limiting the sliding movement of the sleeve in one direction relative to the piston, said sleeve being positioned with each slot longer than the slot in the next sleeve therearound, and means carried by the piston when moved in one direction, for successively shifting the sleeves while in contact with the flexible element, thereby to maintain a bearing surface for said element throughout the area thereof when flexed.

2. Brake apparatus including a unit having a cylinder, a flexible element closing one end of the cylinder, means for directing fluid to or from one face of said element when flexed, a piston in the cylinder having a reduced extension, a retaining device carried by the cylinder and slidably engaged by the extension, concentric relatively slidable sleeves surrounding the extension and slotted to receive said device, the slot in each sleeve being longer than the slot in the next sleeve therearound, all of the sleeves being adapted to lie flush at one end with one end of the extension to provide a substantially smooth bearing surface for the flexible element, and means carried by the piston when moved in one direction, for successively shifting the sleeves while in contact with said element, thereby to maintain a bearing surface for the flexible element throughout the area thereof while flexed to different positions.

3. In brake apparatus a master unit including a cylinder, a piston slidable therein and having a reduced slotted extension, concentric relatively slidable slotted sleeves carried by the extension, a pin extended through the slots in the sleeve and extension and carried by the cylinder for holding one end of the extension and sleeve normally flush, a flexible fluid container supported across one end of the cylinder and having a base contacting with said flush ends, said sleeves being of increasing lengths progressively from the outer sleeve to the inner sleeve, there being means carried by the piston for successively engaging the sleeves when the piston is advanced against the flexible container, to successively transmit pressure through the sleeves to the base of the container thereby to present a bearing surface conforming substantially to the curvature of the base of the container when flexed.

4. In brake apparatus a wheel unit including a base having a fluid inlet and outlet, there being opposed recesses in the base, a cylinder connected to the base, a flexible element interposed between the cylinder and base and extending over the recess to separate it from the cylinder, a piston mounted for reciprocation in the cylinder and having a slotted reduced extension, concentric slotted sleeves slidably mounted on the extension, the slot in each sleeve being longer than the slot in the next sleeve therearound, a retaining device carried by the cylinder and extending through the slots for holding the sleeves normally flush at their ends, said piston and sleeves, when in one extreme position, providing a smooth bearing surface for the flexible element, and means for directing fluid under pressure into the base and against the flexible element to successively shift the surfaces and the sleeves against the retaining means thereby to present a bearing for the entire area of the flexible element when flexed.

5. In brake apparatus a fluid container having a port, a diaphragm constituting a flexible wall of the container, a longitudinally slotted piston slidable toward and from the container, concentric relatively slidable sleeves on the piston, said sleeves and piston cooperating at one end to provide a substantially unbroken bearing for the diaphragm throughout the working surface thereof and while the diaphragm is in either normal or flexed position, said sleeves having longitudinal slots of different lengths respectively, the slots being normally stepped at one end but alined at their other ends with one end of the piston slot, a motion transmitting element connected to the piston, said piston and sleeve constituting means for transmitting thrust successively between said element and diaphragm, and diametrically disposed fixed means extending through all of the slots for successive engagement by the stepped end walls of the slots to limit the relative sliding movement of the sleeves and piston when the diaphragm is flexed in one direction.

JAMES LEWIS HILL.